US006835218B1

(12) United States Patent
Drozd et al.

(10) Patent No.: US 6,835,218 B1
(45) Date of Patent: Dec. 28, 2004

(54) FUEL ADDITIVE COMPOSITIONS

(75) Inventors: Joseph C. Drozd, Park Ridge, IL (US); Harold R. Martin, Cookeville, TN (US); Yu-Sen Chen, Naperville, IL (US)

(73) Assignees: Dober Chemical Corp., Midlothian, IL (US); FleetGuard, Inc., Nashville, TN (US)

(*) Notice: Subject to any disclaimer, the term of this patent is extended or adjusted under 35 U.S.C. 154(b) by 0 days.

(21) Appl. No.: 09/939,196

(22) Filed: Aug. 24, 2001

(51) Int. Cl.[7] ................................................ C01L 1/16

(52) U.S. Cl. ............................ 44/459; 44/385; 44/393; 44/397; 44/403; 44/404; 44/553; 44/572; 44/639; 422/261; 422/263; 123/1 A; 428/403

(58) Field of Search .......................... 44/309, 389, 397, 44/500, 553, 572, 573, 639, 385, 403, 404, 393, 459; 422/261, 263; 123/1 A; 428/403

(56) References Cited

U.S. PATENT DOCUMENTS

| | | | | |
|---|---|---|---|---|
| 2,280,792 | A | | 4/1942 | Bruson |
| 2,754,330 | A | | 7/1956 | Schreyer |
| 2,782,240 | A | | 2/1957 | Hefner et al. |
| 2,841,479 | A | | 7/1958 | Hefner et al. |
| 2,928,877 | A | | 3/1960 | Jaul et al. |
| 2,955,028 | A | * | 10/1960 | Bevans ....................... 137/268 |
| 3,087,436 | A | | 4/1963 | Dettlof et al. |
| 3,172,892 | A | | 3/1965 | Le Suer et al. |
| 3,215,707 | A | | 11/1965 | Rense |
| 3,231,587 | A | | 1/1966 | Rebse |
| 3,272,746 | A | | 9/1966 | Le Suer et al. |
| 3,275,554 | A | | 9/1966 | Wagenaar |
| 3,336,223 | A | | 8/1967 | Kneeland |
| 3,361,673 | A | | 1/1968 | Stuart et al. |
| 3,368,972 | A | | 2/1968 | Otto |
| 3,413,347 | A | | 11/1968 | Worrel |
| 3,422,157 | A | | 1/1969 | Kaufman et al. |
| 3,438,757 | A | | 4/1969 | Honnen et al. |
| 3,440,029 | A | | 4/1969 | Little et al. |
| 3,454,555 | A | | 7/1969 | van der Voort et al. |
| 3,454,607 | A | | 7/1969 | Le Suer et al. |
| 3,565,804 | A | | 2/1971 | Honnen et al. |
| 3,574,576 | A | | 4/1971 | Honnen et al. |
| 3,598,738 | A | | 8/1971 | Biswell et al. |
| 3,649,229 | A | | 3/1972 | Otto |
| 3,671,511 | A | | 6/1972 | Honnen et al. |
| 3,697,574 | A | | 10/1972 | Plasek et al. |
| 3,715,037 | A | | 2/1973 | Hu |
| 3,725,277 | A | | 4/1973 | Worrel |

(List continued on next page.)

FOREIGN PATENT DOCUMENTS

| | | |
|---|---|---|
| EP | 0279863 | 8/1988 |
| EP | 0448365 | 9/1991 |
| EP | 0476485 | 3/1992 |
| EP | 0516838 | 12/1992 |
| EP | 0573578 | 12/1993 |

OTHER PUBLICATIONS

Kelly et al., application Ser. No. 09/939,214, filed Aug. 24, 2001.

Drozd et al., application Ser. No. 09/939,212, filed Aug. 24, 2001.

Martin et al., application Ser. No. 09/939,542, filed Aug. 24, 2001.

Chen et al., application Ser. No. 09/939,527, filed Aug. 24, 2001.

*Primary Examiner*—Cephia D. Toomer
(74) *Attorney, Agent, or Firm*—Stout, Uxa, Buyan & Mullins, LLP; Frank J. Uxa

(57) ABSTRACT

A fuel additive composition comprising a sustained release component and an additive component, the additive component is effective to provide at least one benefit to a fuel when released into the fuel, the sustained release component is (1) a polymeric material, (2) substantially insoluble in the fuel, and (3) effective to reduce the rate of release of the additive component into the fuel relative to an identical composition without the sustained release component.

45 Claims, 2 Drawing Sheets

U.S. PATENT DOCUMENTS

| | | | | |
|---|---|---|---|---|
| 3,726,882 | A | 4/1973 | Traise et al. | |
| 3,749,247 | A | 7/1973 | Rohde | |
| 3,755,433 | A | 8/1973 | Miller et al. | |
| 3,756,793 | A | 9/1973 | Robinson | |
| 3,790,359 | A | 2/1974 | Feldman | |
| 3,822,289 | A | 7/1974 | Clark et al. | |
| 3,849,085 | A | 11/1974 | Kreuz et al. | |
| 3,877,899 | A | 4/1975 | Bundy et al. | |
| 3,880,569 | A * | 4/1975 | Bannister et al. | 431/4 |
| 3,912,764 | A | 10/1975 | Palmer, Jr. | |
| 3,932,537 | A | 1/1976 | Wetzel et al. | |
| 3,954,808 | A | 5/1976 | Elliott et al. | |
| 3,977,992 | A | 8/1976 | Hofacker | |
| 3,980,569 | A | 9/1976 | Pindar et al. | |
| 3,999,960 | A | 12/1976 | Langer, Jr. et al. | |
| 4,026,809 | A | 5/1977 | Lachowicz et al. | |
| 4,032,700 | A | 6/1977 | Song et al. | |
| 4,066,559 | A | 1/1978 | Rohde | |
| 4,075,097 | A | 2/1978 | Paul | |
| 4,075,098 | A | 2/1978 | Paul et al. | |
| 4,110,349 | A | 8/1978 | Cohen | |
| 4,125,382 | A | 11/1978 | O'Brien et al. | |
| 4,129,421 | A * | 12/1978 | Webb | 44/354 |
| 4,137,185 | A | 1/1979 | Gardiner et al. | |
| 4,156,061 | A | 5/1979 | Pappas et al. | |
| 4,214,994 | A | 7/1980 | Kitano et al. | |
| 4,222,746 | A | 9/1980 | Sweeney et al. | |
| 4,231,759 | A | 11/1980 | Udelhofen et al. | |
| 4,234,435 | A | 11/1980 | Meinhardt et al. | |
| 4,238,628 | A | 12/1980 | Cahill et al. | |
| 4,247,301 | A | 1/1981 | Honnen | |
| 4,261,704 | A | 4/1981 | Langdon | |
| 4,265,748 | A | 5/1981 | Villani et al. | |
| 4,294,586 | A | 10/1981 | Cox, Jr. | |
| 4,320,019 | A | 3/1982 | Hayashi | |
| 4,323,714 | A | 4/1982 | Malloy et al. | |
| 4,326,972 | A | 4/1982 | Chamberlin, III | |
| 4,357,250 | A | 11/1982 | Hayashi | |
| 4,365,973 | A * | 12/1982 | Irish | 44/326 |
| 4,379,065 | A | 4/1983 | Lange | |
| 4,460,379 | A | 7/1984 | Sweeney et al. | |
| 4,469,908 | A | 9/1984 | Burress | |
| 4,515,740 | A * | 5/1985 | Schuettenberg et al. | 264/50 |
| 4,561,981 | A | 12/1985 | Characklis | |
| 4,588,640 | A * | 5/1986 | Matlach | 428/407 |
| 4,639,255 | A | 1/1987 | Schuettenberg et al. | |
| 4,658,078 | A | 4/1987 | Slaugh et al. | |
| 4,659,334 | A * | 4/1987 | Matlach | 44/346 |
| 4,663,063 | A | 5/1987 | Davis | |
| 4,668,834 | A | 5/1987 | Rim et al. | |
| 4,673,527 | A | 6/1987 | Goudy, Jr. et al. | |
| 4,708,809 | A | 11/1987 | Davis | |
| 4,717,495 | A | 1/1988 | Hercamp et al. | |
| 4,728,452 | A | 3/1988 | Hansen | |
| 4,740,321 | A | 4/1988 | Davis et al. | |
| 4,755,189 | A | 7/1988 | Feldman | |
| 4,756,844 | A | 7/1988 | Walles et al. | |
| 4,849,569 | A | 7/1989 | Smith, Jr. | |
| 4,857,073 | A | 8/1989 | Vataru et al. | |
| 4,862,908 | A | 9/1989 | Payer | |
| 4,892,562 | A | 1/1990 | Bowers et al. | |
| 4,904,401 | A | 2/1990 | Ripple et al. | |
| 4,937,299 | A | 6/1990 | Ewen et al. | |
| 4,980,075 | A | 12/1990 | Dobrez et al. | |
| 4,981,602 | A | 1/1991 | Ripple et al. | |
| 5,019,669 | A | 5/1991 | Adams et al. | |
| 5,032,259 | A | 7/1991 | He et al. | |
| 5,050,549 | A | 9/1991 | Sturmon | |
| 5,053,152 | A | 10/1991 | Steckel | |
| 5,059,217 | A | 10/1991 | Arroyo et al. | |
| 5,071,919 | A | 12/1991 | DeGonia et al. | |
| 5,089,041 | A | 2/1992 | Thompson et al. | |
| 5,094,666 | A | 3/1992 | Feldman et al. | |
| 5,120,349 | A | 6/1992 | Stewart et al. | |
| 5,137,978 | A | 8/1992 | Degonia et al. | |
| 5,137,988 | A | 8/1992 | Matzner et al. | |
| 5,160,648 | A | 11/1992 | Steckel | |
| 5,186,732 | A | 2/1993 | Thompson et al. | |
| 5,192,335 | A | 3/1993 | Cherpeck | |
| 5,230,714 | A | 7/1993 | Steckel | |
| 5,235,936 | A * | 8/1993 | Kracklauer | 123/1 A |
| 5,249,552 | A | 10/1993 | Brooks | |
| 5,286,823 | A | 2/1994 | Rath | |
| 5,296,154 | A | 3/1994 | Steckel | |
| 5,300,701 | A | 4/1994 | Cherpeck | |
| 5,324,800 | A | 6/1994 | Welborn, Jr. et al. | |
| 5,332,407 | A | 7/1994 | Herbstman | |
| 5,336,278 | A | 8/1994 | Adams et al. | |
| 5,337,705 | A | 8/1994 | Lane | |
| 5,346,965 | A | 9/1994 | Dever et al. | |
| 5,368,615 | A | 11/1994 | Steckel | |
| 5,372,942 | A | 12/1994 | McGarrity et al. | |
| 5,407,594 | A | 4/1995 | Fry et al. | |
| 5,408,018 | A | 4/1995 | Rath | |
| 5,456,217 | A | 10/1995 | Thunker et al. | |
| 5,458,793 | A | 10/1995 | Adams et al. | |
| 5,483,327 | A | 1/1996 | Taya et al. | |
| 5,496,383 | A | 3/1996 | Franz et al. | |
| 5,507,942 | A | 4/1996 | Davis | |
| 5,508,356 | A | 4/1996 | Dever et al. | |
| 5,527,452 | A | 6/1996 | Grigoriev et al. | |
| 5,565,106 | A | 10/1996 | Sherbondy et al. | |
| 5,567,845 | A | 10/1996 | Franz et al. | |
| 5,573,557 | A | 11/1996 | Thünker et al. | |
| 5,580,359 | A | 12/1996 | Wright | |
| 5,591,330 | A | 1/1997 | Lefebvre | |
| 5,620,949 | A | 4/1997 | Baker et al. | |
| 5,643,351 | A | 7/1997 | Lew et al. | |
| 5,662,799 | A | 9/1997 | Hudgens et al. | |
| 5,662,803 | A | 9/1997 | Young | |
| 5,663,457 | A | 9/1997 | Kolp | |
| 5,674,950 | A | 10/1997 | Thaler et al. | |
| 5,691,422 | A | 11/1997 | Emert et al. | |
| 5,695,531 | A | 12/1997 | Makino et al. | |
| 5,696,060 | A | 12/1997 | Baker et al. | |
| 5,696,067 | A | 12/1997 | Adams et al. | |
| 5,711,894 | A | 1/1998 | Miyake et al. | |
| 5,718,836 | A | 2/1998 | Nakatani et al. | |
| 5,739,356 | A | 4/1998 | Dietz et al. | |
| 5,741,433 | A | 4/1998 | Mitchell et al. | |
| 5,752,989 | A | 5/1998 | Henly et al. | |
| 5,752,991 | A | 5/1998 | Plavac | |
| 5,756,435 | A | 5/1998 | Carey et al. | |
| 5,772,873 | A | 6/1998 | Hudgens | |
| 5,777,041 | A | 7/1998 | Emert et al. | |
| 5,777,142 | A | 7/1998 | Adams et al. | |
| 5,780,554 | A | 7/1998 | Emert et al. | |
| 5,786,490 | A | 7/1998 | Dietz et al. | |
| 5,803,024 | A | 9/1998 | Brown | |
| 5,833,722 | A | 11/1998 | Davies et al. | |
| 5,840,920 | A | 11/1998 | Baker | |
| 5,856,524 | A | 1/1999 | Dietz et al. | |
| 5,880,219 | A | 3/1999 | Thaler et al. | |
| 5,897,770 | A | 4/1999 | Hatch et al. | |
| 5,919,869 | A | 7/1999 | Thaler et al. | |
| 5,948,248 | A | 9/1999 | Brown | |
| 6,010,639 | A | 1/2000 | Mitchell et al. | |
| 6,017,369 | A | 1/2000 | Ahmed | |
| 6,020,500 | A | 2/2000 | Baker et al. | |
| 6,074,445 | A * | 6/2000 | Ahmed | 44/385 |
| 6,114,547 | A | 9/2000 | Baker et al. | |
| 6,140,541 | A | 10/2000 | Melder et al. | |
| 6,183,524 | B1 * | 2/2001 | Ahmed | 44/385 |
| 6,238,554 | B1 | 5/2001 | Martin et al. | |
| RE37,369 | E | 9/2001 | Hudgens et al. | |

* cited by examiner

FUEL ADDITIVE COMPOSITIONS

FIELD OF THE INVENTION

The present invention relates generally to fuel additive compositions. More particularly, the present invention is directed to fuel additive compositions comprising a fuel additive component and a sustained release component for use in fuel systems, for example, engine fuel systems, such as those of automobiles, trucks, heavy equipment and the like, and fuel delivering and dispensing systems.

BACKGROUND OF THE INVENTION

Fuel can entrain a wide variety of contaminants from different sources. For example, fuel frequently oxidizes and forms resinous materials such as varnishes commonly referred to as asphaltenes. Also, microorganisms such as bacteria and fungi can grow in fuel. These contaminants degrade the performance of the engine and other downstream components if left within the fuel.

Fuel filters are necessary components used to protect engines by filtering out contaminants. Generally, fuel is filtered as it enters and fills the filter assembly so that the entire filter component is doused with fuel as the fuel passes through the filter component and exits the filter assembly to travel to the engine and other downstream components such as valves, fuel lines, fuel injectors and related components. Additionally, with the advent of electronically controlled fuel injection engine systems, fuel filter systems are playing an ever increasingly important role in reducing and eliminating contaminants in fuel. Such fuel injection systems utilize high injection pressures and are sensitive to various contaminants. For example, due to the high injection pressures of fuel injection systems, minute quantities of contaminants in fuel will damage the injectors, causing galling and erosion of spray holes and tips.

Although the use of a fuel filter assembly helps eliminate contaminants from fuel, the filtering process gives rise to other problems. For example, one major problem is that the filtered contaminants, for example asphaltenes or varnishes, plug the fuel filter component as it is being filtered out from fuel. Such plugging can restrict fuel flow. Restricted fuel flow further degrades the performance of the engine, and if unattended, could lead to continued degradation of performance as well as mechanical and structural failure of the engine's components.

Furthermore, the plugged filter can create a pressure differential in the filter assembly. Pressure differential increases as pressure increases on the unfiltered side of the filter component to force the fuel through. This can lead to contaminants being forced through the filter component, tearing and damaging the filter component.

Therefore, to maintain engine performance and reliability, the fuel filters must be replaced often, frequently as often as every 2,000 to 4,000 vehicle miles. For many vehicles, particularly commercial trucks that travel thousands of miles a month, this significantly increases vehicle maintenance and operating costs. Furthermore, other related issues become predominant with increase filter replacements, such as environmental considerations.

Fortunately, the formation of contaminants that are clogging the filter can be prevented by additives placed in fuel. For example, dispersants can be added to fuel to prevent and dissolve varnishes. However, it is difficult to maintain a constant or desired level of an additive in the fuel. Therefore, additives are typically added to the fuel tank with each fill up. However, this technique of maintaining additives in fuel is inconvenient and inefficient. For example, the additive may not be readily available or the operator may forget to add the additive. Furthermore, when the additive is added to the fuel tank, it does not always form a homogeneous mixture with fuel, which may create engine combustion problems.

Several attempts have been made to provide a fuel filter that not only filters fuel but also can provide a steady, sustained source of fuel additives. Recently, Davis in U.S. Pat. No. 5,372,942 disclosed a pressurized fuel filter having a soluble composition comprising an additive component embedded in a sustained release component, for example wax, the content of which is incorporated in its entirety herein by reference. The wax/additive composition, when contacted by fuel, slowly completely dissolves and releases additives into fuel over a period of time.

Although the device disclosed by Davis allows for slow, sustained release of additives into fuel, there are inherent problems associated with such device and the like. For example, the sustained release component, for example wax, dissolves into the fuel as it releases the additives therein. The dissolved wax may compromise the burn rate of fuel and affect engine performance. Additionally, the soluble wax may accumulate and clog the filter during cold weather operation.

There continues to be a need for an additive composition that is capable of providing a slow sustained release of additive.

SUMMARY OF THE INVENTION

New apparatus and methods for providing release, preferably sustained release, of at least one additive into a fuel, for example, a liquid fuel, have been discovered. The present invention provides fuel additive compositions that, when in contact with fuel, effectively provide for sustained release of a fuel additive into the fuel. The invention also provides an additive assembly that is adapted to be installed along a fuel line of an engine to substantially control the release rate of an additive into fuel passing through the fuel line. The present apparatus and methods are very useful and effective for use in fuel systems, for example, engine fuel systems, such as those of automobiles, trucks, heavy equipment and the like, and fuel delivering and dispensing systems.

The fuel additive compositions, in accordance with the invention, generally comprise a sustained release component and an additive component, wherein the additive component is effective to provide one or more benefits to a fuel, including, but not limited to, a liquid, for example, a hydrocarbon based, fuel, when the additive is released or dissolved into and is present in the fuel. The sustained release component preferably is a polymeric material that is substantially insoluble in the fuel, and is effective to reduce the rate of release of the additive component into the fuel.

In one particularly advantageous embodiment, the sustained release component is in the form of a matrix material, preferably comprising a polymeric material. The matrix material may be, and preferably is, initially a solid. Upon exposure of the fuel additive composition to fuel, for example, at an operating temperature of an engine, the initially solid matrix material may soften. Alternatively, the matrix material may initially be in the form of a gel or a paste. In any event, when exposed to fuel, the fuel additive compositions gradually release the soluble fuel additive or additives from within the matrix material.

A fuel additive assembly of the present invention generally comprises a housing which can be installed along a fuel line. Components of the housing preferably are made of materials which are substantially insoluble in a fuel or fuel composition even at the elevated temperatures of such fuel or composition in a working environment, e.g., an internal combustion engine, so that these components remain intact and do not dissolve into and/or otherwise detrimentally affect the fuel system. In addition, the insoluble components of the present apparatus can be reused after release of the fuel additive contained therein. The present apparatus is easy and straightforward to manufacture cost effectively.

The fuel additive assemblies of the invention are designed for use in fuel systems, such as those associated with vehicles and systems for delivering and/or dispensing fuels and the like systems, which are designed to provide sustained or gradual, preferably substantially controlled, release of at least one additive(s) into a fuel.

In one embodiment, the fuel additive assemblies of the invention comprise a housing defining a chamber including a fuel additive composition in accordance with the present invention contained therein. The additive assembly is adapted to be placed "in-line" at a suitable location along a fuel line. Fuel flowing in the line passes through the assembly and a portion of the fuel additive or additives is released into the fuel.

The fuel additive compositions are preferably in particle or pellet form. In one embodiment of the invention, the fuel additive compositions are in the form of pellets coated with a sustained release material.

In another aspect of the invention, a fuel filter element is provided within the assembly. Fuel entering the assembly will first become filtered of debris and particles before passing though the additive compositions disposed within the housing. Alternatively or additionally, a second filter element may be provided for filtering the fuel after the fuel has passed the additive composition.

In still a further aspect, the invention is directed to methods for releasing an additive component at a sustained, preferably substantially controlled, rate into a fuel, for example, a liquid fuel. The present methods comprise, for example, placing a fuel additive composition of the present invention in, for example, a container or cartridge, preferably made of fuel insoluble materials, in contact with a fuel. Sustained, preferably substantially controlled, release of additives into the fuel is thereby obtained.

Commonly assigned U.S. Patent Applications Serial Nos. (Attorney Docket No. D-2912) and (Attorney Docket No. D-2959CIP), filed on even date herewith, are directed to somewhat related subject matter. The disclosure of each of these co-pending U.S. applications is incorporated in its entirety herein by reference.

Each and every feature described herein, and each and every combination of two or more of such features, is included within the scope of the present invention provided that the features included in such a combination are not mutually inconsistent.

Additional aspects and advantages of the present invention are set forth in the following description and claims, particularly when considered in conjunction with the accompanying drawings in which like parts bear like reference numerals.

DETAILED DESCRIPTION OF THE INVENTION

Figure 1:
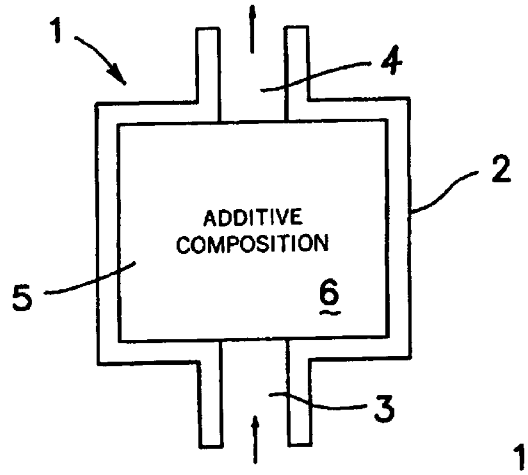
FIG. 1 is a front elevational view in full section of a fuel additive assembly according to a general embodiment of the present invention.

The present invention relates to additive compositions for use in fuel. The additive compositions are capable of slowly releasing additive components into a fuel, preferably a liquid fuel. Advantageously, the fuel is substantially organic, for example, substantially hydrocarbon-based, fuel composition, including, but not limited to, diesel, gasoline, kerosene, jet fuel, biodiesel and synthetic hydrocarbon based liquid fuels such as those obtained in the Fisher-Tropsch process. Optionally, these hydrocarbon-based liquid fuels can contain additives other than those being released by the apparatus of the present invention. These additives include, but are not limited to, oxygenates, antioxidants, anti-wear additives, cetane improvers, corrosion inhibitors, demulsifiers, detergents/dispersants, flow improvers, lubricating agents, metal deactivators and the like and mixtures thereof.

In a broad embodiment, the additive composition comprises an additive component and a sustained release component.

Unless otherwise expressly noted to the contrary, each of the words "include", "includes", "included" and "including" and the abbreviation "e.g." as used herein in referring to one or more things or actions means that the reference is not limited to the one or more things or actions specifically referred to.

The Additive Composition

As used herein, the terms "hydrocarbon", "hydrocarbyl" or "hydrocarbon based" mean that the group being described has predominantly hydrocarbon character within the context of this invention. These include groups that are purely hydrocarbon in nature, that is they contain carbon and hydrogen. They may also include groups containing non hydrocarbon substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms.

As used herein, the expression "polyolefin" defines a polymer derived from olefins. The expression "polyolefinic" refers to a compound containing more than one C=C bond.

Throughout the specification and claims the expression soluble is used. By soluble is meant that an amount needed to provide the desired level of activity or performance can be incorporated by being dissolved dispersed or suspended in a normally liquid fuel. Usually, this means that at least about 0.001% by weight of the material can be incorporated in a normally liquid fuel.

In one broad embodiment, an additive component comprises at least an additive. As used herein, the term "additive" includes all materials which can be compounded or admixed with the sustained release components and which impart beneficial properties to the fuel being circulated through the filter unit.

Preferably, the additive composition includes the following types of additives:

1. Fuel-Soluble Ashless Dispersant/Detergent Additives

Numerous types of additives are used to improve fuel compositions. Such additives include, but are certainly not limited to dispersants and detergents of the ashless and ash-containing variety, oxidation inhibitors, anti-wear additives, friction modifiers, and the like. Such materials are well known in the art and are described in many publications, for example, Smalheer, et al, "Lubricant Additives", Lezius-Hiles Co., Cleveland, Ohio, USA (1967); M. W. Ranney, Ed., "Lubricant Additives", Noyes Data Corp., Park Ridge, N.J., USA (1973); M. J. Satriana, Ed., "Synthetic Oils and Lubricant Additives, Advances since 1979, Noyes Data Corp., Park Ridge N.J., USA (1982), W. C. Gergel, "Lubricant Additive Chemistry", Publication 694-320-65R1 of The Lubrizol Corp., Wickliffe, Ohio, USA (1994); and W. C. Gergel et al, "Lubrication Theory and Practice" Publication 794-320-59R3 of The Lubrizol Corp., Wickliffe, Ohio, USA (1994); and in numerous United States patents, for example, Chamberlin, III, U.S. Pat. No 4,326,972, Schroeck et al, U.S. Pat. No. 4,904,401, and Ripple et al, U.S. Pat. No. 4,981,602. The disclosure of each of these publications and patents is incorporated in its entirety herein by reference.

Many such additives are frequently derived from carboxylic reactants, for example, acids, esters, anhydrides, lactones, and others. Specific examples of commonly used carboxylic compounds used as intermediates for preparing fuel additives include alkyl and alkenyl substituted succinic acids and anhydrides, polyolefin substituted carboxylic acids, aromatic acids, such as salicylic acids, and others. Illustrative carboxylic compounds are described in Meinhardt, et al, U.S. Pat. No. 4,234,435; Norman et al, U.S. Pat. No. 3,172,892; LeSuer et al, U.S. Pat. No. 3,454,607, and Rense, U.S. Pat. No. 3,215,707. The disclosure of each of these patents is incorporated in its entirety herein by reference.

Many carboxylic intermediates used in the preparation of fuel additives contain chlorine. While the amount of chlorine present is often only a very small amount of the total weight of the intermediate, the chlorine frequently is carried over into the desired carboxylic derivative. For a variety of reasons, including government regulation, environmental concerns, and commercial reasons, the industry has been making efforts to reduce or to eliminate chlorine from additives designed for use as fuel additives.

Accordingly, it is desirable to provide low chlorine or chlorine free intermediates which can be used to prepare low chlorine or chlorine free additives for use in fuels. In one embodiment, these intermediates are made by the process disclosed in U.S. Pat. No. 5,840,920, the disclosure of which is incorporated in its entirety herein by reference.

In addition, certain materials and/or methods useful in producing intermediates and/or additives useful in fuels are disclosed in European patent publication EP 279,863 and U.S. Pat. Nos. 3,598,738; 4,026,809; 4,032,700; 4,137,185, 4,156,061; 4,320,019; 4,357,250; 4,658,078; 4,668,834; 4,937,299; 5,324,800, 5,071,919; 5,137,978; 5,137,988; 5,286,823; 5,408,018; 3,361,673, 3,087,436; 3,172,892; 3,272,746; 3,215,707; 3,231,587; 3,912,764; 4,110,349; 4,234,435; 5,053,152; 5,160,648; 5,230,714; 5,296,154; 5,368,615; 5,696,060; 5,696,067; 5,739,356; 5,777,142; 5,856,524; 5,786,490; 6,020,500; and 6,114,547. The disclosure of each of this European patent publication and these U.S. Patents is incorporated in its entirety herein by reference.

In one embodiment, the fuel-soluble ashless dispersant/detergent comprises an aromatic compound. Examples of such additives include those that are described in U.S. Pat. No. 5,458,793, the disclosure of which is incorporated in its entirety herein by reference.

For example, the additive may have the general formula:

(I)

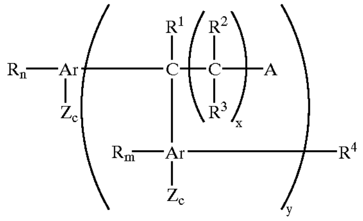

wherein each Ar is independently an aromatic group having from about 5 to about 30 carbon atoms having from 0 to about 3 optional substituents selected from, for example, the group consisting of amino, hydroxy- or alkyl-polyoxyalkyl, nitro, aminoalkyl, carboxy or combinations of two or more different optional substituents, each R is independently a hydrocarbyl group, $R^1$ is H or a hydrocarbyl group, $R^2$ and $R^3$ are each, independently, H or a hydrocarbyl group, $R^4$ is selected from the group consisting of H, a hydrocarbyl group, a member of the group of optional substituents on Ar or lower alkoxy, each m is independently 0 or an integer ranging from 1 to about 6, x ranges from 0 to about 8, and each Z is independently OH, lower alkoxy, $(OR^5)_b$, $OR^6$ or $O^-$ wherein each $R^5$ is independently a divalent hydrocarbyl group, $R^6$ is H or hydrocarbyl and b is a number ranging from 1 to about 30 and c ranges from 1 to about 3, y is a number ranging from 1 to about 10 and wherein the sum m+c does not exceed the number of valences of the corresponding Ar available for substitution and each A is independently an amide or an amide-containing group, a carboxyl group, an ester group, an acylamino group or a group characterized by the formula:

(II)

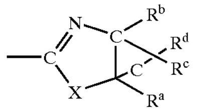

wherein $R^b$, $R^c$, $R^d$ and $R^e$ are each independently H, hydroxyhydrocarbyl or hydrocarbyl groups, and X is O, S or $NR^a$ wherein $R^a$ is H, hydrocarbyl, hydroxyhydrocarbyl, aminohydrocarbyl or a group of the formula:

$$-(Y)_a-R^5-D \quad \text{(III)}$$

wherein each Y is a group of the formula:

(IV)

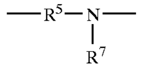 or $-R^5O-$ each $R^5$ is a divalent hydrocarbyl group, each $R^7$ is H, alkoxyalkyl, hydroxyalkyl, a hydrocarbyl group, an aminohydrocarbyl group, or an N-alkoxyalkyl- or hydroxyalkyl-substituted aminohydrocarbyl group, a is 0 or a number ranging from 1 to about 100 and D is a group of the formula:

(V)

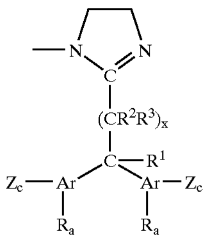

or when one Z and A are taken together, a lactone group of the formula:

(VI)

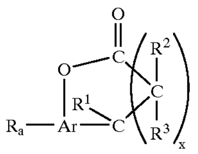

provided at least one A is a group of formula (II).

In addition, certain materials and/or methods useful in producing such additives are disclosed in the article entitled, "Alkylation of Phenols", Third Edition, Vol. 2, pages 65–66, InterScience publishers, a division of John Wiley and company, N.Y. and in U.S. Pat. Nos. 5,458,793; 3,954,808; 5,336,278; 4,379,065; 4,663,063; 4,708,809 and 5,620,949. The disclosure of each of this publication and these patents is incorporated in its entirety herein by reference.

2. Fuel-Soluble Ashless Disperant/Detergent Comprising an Aliphatic Hydrocarbyl Substituted Amine Having at Least One Basic Nitrogen Atom In another embodiment, the fuel-soluble ashless dispersant/detergent used in the invention is an aliphatic hydrocarbyl-substituted amine having at least one basic nitrogen atom. These aliphatic hydrocarbyl-substituted amines and processes for preparing them are well known in the art. They are disclosed in, for example, U.S. Pat. Nos. 6,140,541; 3,275,554; 3,438,757; 3,454,555; 3,565,804; 3,574,576; 3,671,511; 3,755,433; 3,756,793; 3,822,289; 5,346,965; 5,508,356; 5,496,383; 5,567,845; 5,674,950; 5,691,422; 5,777,041; 5,780,554; 5,880,219; and 5,919,869 and in European patent publications EP-B-573 578; EP-B-516 838; and EP-B-476 485. The disclosure of each of these patents is incorporated in its entirety herein by reference.

In one example, aliphatic hydrocarbyl-substituted amines with the formula:

(VII)

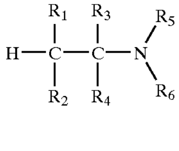

may be prepared where $R_1$, $R_2$, $R_3$ and $R_4$, independently of one another, are each hydrogen or an unsubstituted or substituted, saturated or mono- or polyunsaturated aliphatic radical having a number-average molecular weight of up to about 40000, at least one of the radicals $R_1$ to $R_4$ having a number-average molecular weight of from about 150 to about 40000, and $R_5$ and $R_6$, independently of one another, are each hydrogen, alkyl, cycloalkyl, hydroxyalkyl, aminoalkyl, alkenyl, alkynyl, aryl, arylalkyl, alkylaryl, hetaryl or an alkyleneimine radical of the formula:

(VIII)

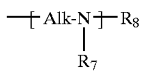

where Alk is straight-chain or branched alkylene, m is an integer from 0 to 10, and $R_7$ and $R_8$, independently of one another, are each hydrogen, alkyl, cycloalkyl, hydroxyalkyl, aminoalkyl, alkenyl, alkynyl, aryl, arylalkyl, alkylaryl or hetaryl or, together with the nitrogen atom to which they are bonded, form a heterocyclic structure, or $R_5$ and $R_6$, together with the nitrogen atom to which they are bonded, form a heterocyclic structure, it being possible for each of the radicals $R_5$, $R_6$, $R_7$ and $R_8$ to be substituted by further alkyl radicals carrying hydroxyl or amino groups, wherein an epoxide of the formula:

(IX)

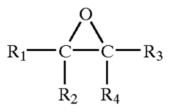

where $R_1$, $R_2$, $R_3$ and $R_4$ have the abovementioned meanings, is reacted with a nitrogen compound of the formula:

(X)

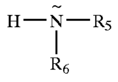

where $R_5$ and $R_6$ have the abovementioned meanings, to give the amino alcohol of the formula:

(XI)

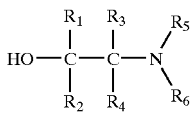

the amino alcohol of the formula (XI) is catalytically dehydrated and the olefin formed is hydrogenated to give the amine of the formula (VII).

In a first useful embodiment, the conversion of the epoxide (IX) to the amine (VII) is carried out in one stage by reacting the epoxide (IX) with the nitrogen compound (X) in the presence of hydrogen and of a catalyst which has dehydrating and at the same time hydrogenating properties.

In a second useful embodiment, the conversion of the epoxide (IX) to the amine (VII) is carried out in two stages by first reacting the epoxide (IX) with the nitrogen compound (X) in the presence of an alkoxylation catalyst to give the amino alcohol (XI) and, if necessary, separating off unconverted reactants. The amino alcohol (XI) is hydrogenated in a second stage in the presence of a catalyst which has dehydrating and at the same time hydrogenating properties to give the amine (VII).

3. Fuel-Soluble Ashless Mannich-Type Dispersant/Detergent

Another class of fuel-soluble dispersant/detergent is Mannich dispersants. Mannich dispersants are generally formed by the reaction of at least one aldehyde, such as formaldehyde or paraformaldehyde, an amine, and at least one alkyl substituted hydroxyaromatic compound. The hydroxyaromatic compound is generally an alkyl substituted hydroxyaromatic compound, including phenols. The hydroxyaromatic compounds are those substituted with at least one, and preferably not more than two, aliphatic or alicyclic groups having from about 6 to about 400, or from about 30 to about 300, or from about 50 to about 200 carbon atoms. These groups can be derived from one or more olefins or polyalkenes. In one embodiment, the hydroxyaromatic compound is a phenol substituted with an aliphatic or alicyclic hydrocarbon-based group having a weight average molecular weight (MW) of about 500 to about 2000. Mannich dispersant additives are disclosed in U.S. Pat. Nos. 3,980,569; 3,877,899; 3,368,972; 3,413,347; 3,649,229; 3,697,574; 3,725,277 and 3,726,882. The disclosure of each of these patents is incorporated in its entirety herein by reference.

One such additive may be made by reacting an aldehyde reactant having more than one carbon atoms, or a ketone reactant, or a mixture of said aldehyde and ketone reactants with the following Mannich condensation products: (1) Mannich products formed by the condensation of an alkyl-substituted phenol, formaldehyde, and an alkylene polyamine, and (2) Mannich condensation products formed by the condensation of a methyl-substituted aminopyridine, form-aldehyde, and an alkylene polyamine.

Preferably, the aldheyde and ketone reactants have at least 6 carbon atoms. The greater number of carbon atoms in the aldehyde and ketone reactants and the greater the branching of the hydrocarbon chain of these reactants, the more oil-soluble the condensation product.

Examples of suitable aldehyde reactants are: hexanal, heptanal, 2-methyl heptanal, 2-ethyl heptanal, 2-methyl-4-ethyl heptanal, 3-methyl decanal, 3,5-dimethyl decanal, 3-ethyl-5-methyl decanal, 5-butyl decanal, 5-methyl-6-butyl decanal, 5-methyl pentadecanal, 5-ethyl pentadecanal, and 3-methyl heptadecanal. Examples of suitable ketone reactants are: 2-hexanone, 3-heptanone, 3-octanone, 2-methyl-3-octanone, 2-ethyl-3-octanone, 5-methyl-3-decanone, 5-ethyl-3-decanone, 5-propyl-3-decanone, 5-propyl-3-undecanone, 5-penta-3-decanone, 2-methyl-5-pentadecanone, 2-ethyl-5-pentadecanone, and 2-propyl-5-pentadecanone.

The alkyl substituents of preferred alkyl-substituted phenols contain less than about 40 carbon atoms, and most preferably contain branched alkyl groups from about 1 to about 18 carbon atoms. The preferred methyl-substituted-aminopyridine is 2-amino-4,6-dimethyl pyridine. Other suitable methyl-substituted-aminopyridines are: alphapicoline, beta-picoline, and gamma-picoline.

Suitable alkylene polyamines include those within the formula:

$$H_2N(\text{-alkylene-NH})_nH \quad \text{(XII)}$$

in which n is an integer from about 1 to about 10, and "alkylene" is a saturated divalent hydrocarbon having from about 2 to about 8 carbon atoms. The preferred alkylene polyamines are ethylene polyamines ("alkylene" having 2 carbon atoms) of which tetraethylene pentamine is the most preferred. Other alkylene polyamines include, for example, propylene polyamines, butylene polyamines, and cyclic homologues of such polyamines, for example piperazines. Specific examples of still other alkylene polyamines are: ethylene diamine, diethylene triamine, penta-ethylene tetramine, and N-2-aminoethyl-piperazine.

In addition, certain materials and/or methods useful in producing such additives are disclosed in U.S. Pat. Nos. 3,422,157; 3,932,537; 4,469,908; 4,323,714; 4,740,321; 4,849,569; 5,019,669; 5,300,701 and 5,663,457 the disclosure of each of which is incorporated herein in its entirety by reference.

4. Fuel -Soluble Poly(oxyalkylene)amine Having at Least One Basic Nitrogen Atom; "Polyether Polyamines"

Still another type of dispersant/detergent suitable for use in this invention includes the poly(oxyalkylene) amine having at least one basic nitrogen atom and a sufficient number of oxyalkylene units to render the poly(oxyalkylene) amine soluble in hydrocarbons falling in the gasoline or diesel range. This type of additive may be termed hydrocarbylpoly (oxyalkylene) polyamines, polyalkylene glycol polyamines, or for convenience, "polyether polyamines"

Suitable poly(oxyalkylene) amine compounds include hydrocarbyl poly(oxyalkylene) polyamines as disclosed, for example, in U.S. Pat. Nos. 3,440,029; 4,247,301; 4,261,704; 5,192,335; and 5,752,991, the disclosure of each of which is incorporated in its entirety herein by reference.

An example of a poly(oxyalkylene) amine compound is a long chain alkylphenyl polyoxyalkylene amine having the formula:

(XIII)

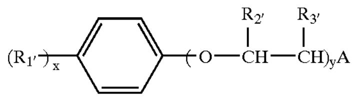

wherein $R_1$, is an alkyl group having at least 40 carbon atoms; $R_2$, and $R_3$, are each independently hydrogen or lower alkyl having from about 1 to about 2 carbon atoms and each $R_2$ and $R_3$ is independently selected in each —O—$CHR_2$ —$CHR_3$—unit; A is an amine moiety derived from ammonia, a primary alkyl monoamine having about 1 to 20 carbon atoms, a secondary dialkyl monoamine having about 1 to 20 carbon atoms in each alkyl group, or a polyamine having about 2 to about 12 amine nitrogen atoms and about 2 to about 40 carbon atoms; a is an integer from about 1 to about 2; and y is an integer from about 5 to about 50.

In another embodiment, the poly(oxyalkylene) amines can be conveniently made by condensing a hydroxy compound, ROH with an alkylene oxide $C_{mH2m}O$, or a mixture of such oxides, then optionally, with a second alkylene oxide, $C_mH_{2n}O$, or mixture, and finally attaching the terminal amino group by either reductive amination (U.S. Pat. Nos. 2,754,330 and 2,928,877) or by cyanoethylation followed by hydrogenation (U.S. Pat. No. 2,280,792). The disclosure of each of these patents is incorporated in its entirety herein by reference.

In addition, certain materials and/or methods useful in producing such additives are disclosed in U.S. Pat. Nos. 3,849,085; 4,231,759; 4,238,628; 4,247,301; 4,261,704; 2,841,479; and 2,782,240 and in published European Patent Application No. 0,448,365 Al, published Sep. 25, 1991, and in Kirk Othmer's "Encyclopedia of Chemical Technology," Vol. 19, Interscience Publishers, New York (1998). The disclosure of each of these patents, patent application and publication is incorporated in its entirety herein by reference.

In one embodiment, the fuel additive compositions comprise a microbiocide compatible with combustion systems and fuels, which is more soluble in fuel than water. In another embodiment, a flow enhancer is added to the fuel. For example, fatty amides derived from succinic acid and phthalic acid are used as wax crystal growth inhibitors, as disclosed by Davies et al U.S. Pat. No. 5,833,722, the disclosure of which is incorporated in its entirety herein by reference. Also, a branched hydrocarbon mixture of about 1000 MW with copolymer of ethylene and unsaturated ether are used, as described by Feldman U.S. Pat. No. 3,790,359, the disclosure of which is incorporated in its entirety herein by reference. Alkyldiphenyl ether, as disclosed by Langer et al U.S. Pat. No. 3,999,960, the disclosure of which is incorporated in its entirety herein by reference, can also be used in this invention as a flow enhancer, for example, fuel wax crystal inhibitor.

Suitable antioxidants that can be added to fuel are metal dithiophosphates and metal dithiocarbonates. One particular anti-oxidant additive that has been found to be highly satisfactory and is preferred is a phenolic anti- oxidant, 4,4'-methylene-bis (2,6-di-tertbutylphenol), which is commercially available under the tradename ETHYL 702 (Ethyl Corporation).

Anti-wear agents, such as sulfur, metal naphthenates, phosphate esters and sulfurized hydrocarbons, etc., may also be used. One highly satisfactory and preferred EP additive, which is highly satisfactory as a bearing corrosion inhibitor is zinc dibutyldithio-carbamate, which is commercially available as BUTYL ZIMATE (R. T. Vanderbuilt Company).

Flow improvers, such as are disclosed by Feldman et al U.S. Pat. No. 5,094,666, the disclosure of which is incorporated in its entirety herein by reference, can be used. For example, such anti-gel and cold flow additives comprise copolymers of ethylene and vinyl esters of fatty acids with molecular weight of 500–50,000; or Tallow amine salt of phthalic anhydride, used at 0.005-0.2%; or Tallow amine salt of dithio-benzoic acid, used at 0.005–0.15%; or 4-hydroxy, 3,5-di-t-butyl dithiobenzoic acid; or ethylene-vinyl acetate copolymers.

Dispersants/detergents, such as that disclosed by Herbstman U.S. Pat. No. 5,332,407, the disclosure of which is incorporated in its entirety by reference herein, can also be used. For example, in one embodiment, such dispersants/detergents include 4-alkyl-2-morpholine and alkylphenyl polyoxyalkylene amine.

Lubricating agents may also be used, for example, carboxylic acid polyol esters, dimer acid, polyol esters, castor oil, vegetable oils, fatty methyl esters (especially rapeseed), glycol esters, particularly oleates and linoleates (unsaturated). Lubricating agents, such as disclosed by Carey et al U.S. Pat. No. 5,756,435, the disclosure of which is incorporated in its entirety herein by reference, can be included. Examples of lubricating agents further include glycerol monooleate, or fatty formates, or fatty amides or 1,2-alkane diols.

Stabilizers, such as disclosed by Sweeney et al U.S. Pat. No. 4,460,379, the disclosure of which is incorporated in its entirety herein by reference, may be used. For example, such additive includes a hydrocarbyl polyoxypropylene di(polyoxyethylene) amine.

Emission (e.g., CO and nitrogen oxides) reducing agents, such as disclosed by Bowers et al U.S. Pat. No. 4,892,562, the disclosure of which is incorporated in its entirety herein by reference, may be used. For example, 0.01–1.0 ppm of fuel-soluble organometallic platinum compound in an oxygenated solvent such as octyl nitrate can be used as an emission reduction additive. Another example of emission additive includes dibenzyl cyclooctadiene platinum II in octyl nitrate. Cox U.S. Pat. No. 4,294,586 also discloses an emission reduction additive for use in diesel fuel. Such additive includes a mixture of alcohol, toluene, and hydrogen peroxide. Additionally, Vararu et al U.S. Pat. No. 4,857,073 discloses a composition comprising in admixture form about 6% of di-tertiary butyl peroxide, about 1% of tall oil imidazoline, about 0.5% of neo-decanoic acid and the balance being a hydrocarbon solvent carrier thoroughly mixed with the peroxide, imidazoline and acid. The disclosure of each of the above Cox Patent and Vararu et al Patent is incorporated in its entirety herein by reference.

Demulsifiers, such as that disclosed by O'Brien et al U.S. Pat. No. 4,125,382, the content of which is incorporated in its entirety by reference herein, may be used. For example, such an additive includes polyoxyethylene ethers.

Sustained Release Component

The operating temperature of a fuel filter is about 49° C., but may approach as high as about 100° C. Therefore, when the polymeric material is used in a fuel filter assembly and the like, it is preferable that it has a melting point in the range of about 50° C. to about 200° C. More preferably, the melting point is in the range of about 77° C. to about 170° C. Also, the polymeric material is hard and non-sticky. Furthermore, the polymeric material is preferably insoluble in fuel, more preferably diesel fuel.

In a broad embodiment, the sustained release component provides for a control of the release rate of the additive component. For example, a sustained release component is effective to slow down the release of the additive components of the additive composition into a fuel. In one embodiment, a sustained release compound comprises a polymeric material. The polymeric material may be a gel, preferably a solid. Without wishing to limit the invention to any mechanism or theory of operation, it is believed that the polymeric material serves as a physical barrier between the fuel and the additive component to slow down the release, for example, diffusion, of additives into fuel.

In a preferred embodiment, the polymeric material includes polymer repeating units derived from an olefin component having 2 to about 12 atoms per molecule. Such polyolefins are generally polymers of unsubstituted, aliphatic hydrocarbon olefins of 2 to about 12 carbon atoms, and are more particularly polymers of an unsubstituted, aliphatic hydrocarbon olefin of 2 to about 12 carbon atoms and a substituted, aliphatic hydrocarbon olefin of 2 to about 12 carbon atoms. In one useful embodiment, the polymeric material is oxidized. In another preferred embodiment, the polymeric material is amidized.

In one embodiment, the matrix material includes an aliphatic acid component, for example, an aliphatic acid component which includes aliphatic acid molecules having about 18 or about 28 to about 36 carbon atoms. A particularly useful aliphatic acid component is montanic acid, nominally $C_{28}H_{56}O_2$. Suitable aliphatic acid components, for example, montanic acids, preferably have melting points from about 76° C. to about 87° C., more preferably about 76° C. to about 81° C. In one useful embodiment, the aliphatic acid component melting point of at least about 80° C., or at least about 82° C. Montanic acids with these characteristics are known, for example, is under the tradename S-Wachs.

In a preferred embodiment, the aliphatic acid component, for example, montanic acid, may also be esterified to form an aliphatic acid ester wax, for example, a montanic acid ester wax. The aliphatic acid ester wax preferably has a predominant ingredient of esters of about $C_{20}$ to about $C_{30}$ fatty acids, including montanic acid.

In another preferred embodiment, the montanic acid may link with other aliphatic carboxylic acids to form carboxylic acid amides. For example, montanic acids may be linked to at least one aliphatic carboxylic acid having at least about 10 carbon atoms, preferably from about 14 to about 25 carbon atoms, with at least difunctional polyamines, polyols, or alkanolamines having molecular weights from about 60 to about 400, preferably from about 60 to about 200.

Other polymeric materials are also capable of forming the sustained release component. These polymeric materials include: ethylcellulose, cellulose, silicones, rubbers, fatty and synthetic surfactants, thermoplastic resins, adsorbants (clays) and mixtures thereof.

Preferred polyolefins are prepared from unsubstituted, aliphatic hydrocarbon monoolefins, including straight chain and branched chain compounds such as ethylene, propylene and butene-1, isobutene, pentene, hexene, heptene, octene, isobutene, 3-methylbutene-1, 4-methylpentene-1, 4-methylhexene-1, and 5-methylhexene-1.

The polyolefin also preferably contains an unsubstituted, aliphatic hydrocarbon polyene, such as diene or triene, as a monomer unit. Such unsubstituted compounds can be straight chain, branched chain or cyclic compounds. Generally, polyenes of from about 4 to about 12 carbon atoms are employed.

Suitable comonomers for preparing the polyolefins are those utilized to prepare homopolymers as listed above, such as propene or butene-1 with ethylene or isobutylene with isoprene and the like. Suitable termonomers are those utilized to prepare homopolymers and copolymers as disclosed above such as propene, ethylene and the like containing up to about 15 percent, preferably up to about 10 percent by weight of polyene, for example, a diene such as dicyclopentadiene, 1,3-butadiene, 1,5-cyclooctadiene, 2-ethylidenenorbornene-5,1,4-hexadiene, 1,4-heptadiene, bicyclo(2,2,1) hepta-2,5-diene and other conjugated and especially nonconjugated dienes with linear or cyclic chains.

Trienes such as isopropylidene cyclopentadiene and the Diels-Alder mono- and di-adducts thereof with cyclopentadiene can be used in place of the diene.

Unsubstituted aliphatic diolefins can also be used for preparing useful polyolefins such as butadiene, isoprene, octadiene, and the like. Especially useful are the various forms of polybutadiene, such as made in emulsion, suspension or solution processes, and random, block, and star block polymers with monomers such as styrene.

The polymeric material may include different polymer repeating units derived from ethylenically unsaturated monomers. In one embodiment, the polymeric material comprises polyethylene. In a useful embodiment, the material comprises oxidized polyethylene wax. In another useful embodiment, the material comprises amidized polyethylene wax.

In another embodiment, the polymeric material is a copolymer of ethylene and vinyl acetate, for example, a polyethylene/vinyl acetate copolymer sold under the trademark Airflex 410 from Air Products. Polyethylene/vinyl acetate copolymer provides a highly fuel resistant protective membrane and is able to withstand high temperatures. In one embodiment, the polymeric material is a copolymer of ethylene and butylene.

In another embodiment, the polymeric material is polypropylene, more preferably polypropylene oxide, having a molecular weight of about 500,000. Such polypropylene oxide is sold under the trademark Coathylene PY 0787F. Other ethylenically unsaturated monomers include ethylene-propylene copolymers ranging in molecular weight from about 200,000 to about 300,000; ethylene-ethylacrylate polymers ranging in molecular weight from about 200,000 to about 30,000. One polymer that has been found to be highly satisfactory and which is preferred is polyisobutylene ranging in molecular weight from approximately 60,000 to about 135,000, and a preferred polyisobutylene is identified by the registered trademark VISTANEX that is manufactures by the Enjay Chemical Company.

Repeating units derived from an ethylenically unsaturated monomer used to form the polymeric material includes: Monoolefinic hydrocarbons, i.e. monomers containing only carbon and hydrogen, including such materials as ethylene, propylene, 3-methylbutene-1, 4-methylpentene-1, pentene-1, 3,3-dimethylbutene-1, 4,4-dimethylbutene-1, octene-1, decene-1, styrene and its nuclear, alpha-alkyl or aryl substituted derivatives, e.g., o-, -or p-methyl, ethyl, propyl or butyl styrene, alpha-methyl, ethyl, propyl or butyl styrene; phenyl styrene, and halogenated styrenes such as alpha-chlorostyrene; monoolefinically unsaturated esters including vinyl esters, e.g., vinyl acetate, vinyl propionate, vinyl butyrate, vinyl stearate, vinyl benzoate, vinyl-p-chlorobenzoates, alkyl methacrylates, e.g., methyl, ethyl, propyl, butyl, octyl and lauryl methacrylate; alkyl crotonates, e.g., octyl; alkyl acrylates, e.g., methyl, ethyl, propyl, butyl, 2-ethylhexyl, stearyl, hydroxyethyl and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl compounds, e.g., allyl chloride, ally alcohol, allyl cyanide, allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, ethyl alpha-chloroacrylate, methyl alphabromoacrylate, ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alpha-cyanoacrylate and ethyl alpha-cyanoacrylate and maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1, 3-octenonitrile, crotononitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl-2-chloroethyl ether, vinyl propyl ether, vinyl n-butyl ether, vinyl isobutyl ether, vinyl-2-ethylhexyl ether, vinyl 2-chloroethyl ether, vinyl cetyl ether and the like; and vinyl sulfides, e.g., vinyl beta-chloroethyl sulfide, vinyl beta-ethoxyethyl sulfide and the like can also be included as can diolefinically unsaturated hydrocarbons containing two olefinic groups in conjugated relation and the halogen derivatives thereof, e.g., butadiene-1,3; 2-methylbutadiene-1,3, 2,3-dimethylbutadiene-1,3; 2-methylbutadiene-1,3; 2,3-dimethylbutadiene-1,3; 2-chlorobutadiene-1,3; 2,3-dichloro-butadiene-1,3; and 2-bromo-butadiene-1,3 and the like. Mixtures of the foregoing compounds can also be employed.

Particularly useful monomer compositions also include styrene, methyl methacrylate, methyl acrylate, vinyl acetate, mixtures of styrene and acrylonitrile, and mixtures of styrene and various maleates.

In accordance with this invention, a sustained release component may be a matrix material or a coating material. When the sustained release component is mixed with the additive component, the sustained release component is referred to as a matrix material. When the sustained release component is coated around the additive component, the sustained release component is referred to as a coating material. Regardless whether the sustained release component is a matrix material or a coating material, it is preferably insoluble in fuel.

In one embodiment, the matrix material, without limitation, may be selected from any of the sustained release component polymeric material. In one embodiment, the matrix may be a mixture of polymers selected to achieve the required release rates, hardness, solubility and melting range. Such mixtures may include, for example, polyethylene/polypropylene, preferably ethylene/butylene, which has better durability. The matrix material may further serve as a structural agent to the composition. In one embodiment, the matrix material is a gel. In a preferred embodiment, the matrix material is a solid, for example a wax.

In one embodiment, the additive composition is layered. For example, the innermost core of the additive composition may be a mixture of an additive component and a first matrix material. The next layer of the additive composition may be a mixture of an additive component and a matrix material different from the first. Alternatively, the next layer may be a mixture of the additive component and the matrix material of the first layer, but having a different mixture ratio. The additive composition of the present invention may include more than one layer. In one embodiment, the additive composition comprises more than two layers. In another embodiment, the additive composition comprises more than three layers. Such layered additive composition provides for a variable release profile, for example fast and then slow.

Other arrangement schemes may serve to vary the release pattern of the additive component. For example, an additive composition of the present invention may comprise a liquid additive component, for a example a dispersant, which is covered with a solid layer of an additive component/matrix material mixture to control the release pattern.

In one embodiment, an additive composition comprising an additive component and a matrix material may further include a release enhancer component to increase the release rate. A release enhancer component may be selected from wicking materials, surfactants, for example, non-ionic surfactants, e.g., polyoxyethylene-polyoxypropylene copolymers and the like and mixtures thereof. Such wicking materials may include, without limitation, cotton and polyester fibers and mixtures thereof.

In one embodiment, an additive composition comprising an additive component and a matrix material may further include a reinforcement component to reinforce the structure of the additive composition, making it less susceptible to erosion by flowing fuel. Such a component may include, without limitation, fibers. In a preferred embodiment, cotton, polyester and/or fiberglass fibers and mixtures thereof are added to the matrix, preferably molten matrix, of the additive composition.

In a preferred embodiment, the matrix material is poly propylene, preferably polypropylene wax, sold under the trademark Licowax PP 230. Polypropylene wax is preferable due to its insolubility at high temperatures. Also, polypropylene is preferable because it has a high softening point, i.e., 329 C. Higher softening point allows the polymeric material to remain intact as a unit to maintain a steady rate of release.

An additive composition of the present invention may include an outer coating material which encases or surrounds the selected additive component, and/or mixture of additive component/matrix material forming a coated-additive composition. The coating material preferably is present in an amount effective to reduce the rate of release of the additive component from the coating composition into a fuel relative to the additive release rate from an identical composition without the coating material. The coating material may be selected from any of the sustained release components as disclosed above. In one embodiment, the coating material includes a molten polymeric material (a molten sustained release component), for example, an emulsion polymer, or a polymeric material in a solvent material. The solvent material may be aqueous, alcoholic or organic in nature or may be a mixed solvent. Of course, the solvent should be selected so that the coating material is soluble therein and the solvent has no significant detrimental effect on the coating material, the additive composition, or on the performance of the final product. In a preferred embodiment, the coating material comprises polyethylene vinyl acetate.

Outer coatings may be hard or soft and while each style has its own mechanism for exposing the encased additives to the fuel, either style is suitable for use with the present invention. For example, polyvinylidene chloride (PVDC) may be used as a coating material. PVDC is a hard coating which releases additives when fuel soaks through the coating. The fuel causes the additives inside of the coating to swell and eventually this causes the coated pellet to crack open. This then exposes the additives inside to the fuel. An example of a soft coating material is polyvinyl acetate (PVA). While fuel also penetrates the soft coating, it does not crack open because it is pliable. Instead the fuel diffuses through the coating, dissolves some of the additives and then escapes back out of the coated composition. Both the PVDC and PVA coating materials are insoluble in fuel at the engine operating temperature.

Table 1 shows other polypropylene wax compounds and mixtures that are good matrix material because they are insoluble at high temperatures and have high softening points.

In one embodiment, the matrix material is polyethylene wax, preferably oxidized polyethylene wax, for example, sold under the trademark Licowax PED Wax 522 by Clariant. However, as seen from Table 1, this matrix material melts at high temperatures, for example, about 121° C. Although it may melt at high temperatures, it is still useful as a matrix material, for example, with polyethylene vinyl acetate and the like fuel resistant materials. Table 1 shows that when an additive distributed in matrix material is coated with 18% polyethylene vinyl acetate, it is insoluble at 121° C. Moreover, the fuel in which the coated-additive-matrix composition is situated does not turn cloudy, even at 121° C. This observation indicates that the oxidized polyethylene wax is substantially insoluble.

TABLE 1

Hot Fuel Resistance of Tablets made with 50% Dispersant in Various Matrices

| Matrix Name | Composition | Softening point, ° F. | Solubility in Fuel ½ hr at 121° F. | Solubility in Fuel 24 hrs at 104° F. |
|---|---|---|---|---|
| Licowax PED 522 | Polyethylene wax, oxidized | 221 | Dissolved | Insoluble |
| Licowax PED 522 w/18% PE/VA coating | Polyethylene wax, oxidized | 221 | Insoluble | Insoluble |
| Licowax PED 552 with 10% PE/VA[1] coating | Polyethylene wax, oxidized | 221 | Insoluble | Insoluble |
| Licowax PED 153 | Polyethylene wax, oxidized | 248 | Dissolved | Dissolved |
| Licowax PE 190 | Polyethylene wax | 275 | 50% dissolved | 50% dissolved |
| Licowax PP 230 | Polypropylene wax | 320 | Insoluble | Insoluble |
| Licowax C PM | | | 50% dissolved | 50% dissolved |
| Licolube FA-I | Amide wax | | 50% dissolved | 50% dissolved |
| Coathylene PY 0787F | Polypropylene | 329 | Insoluble | Insoluble |
| Licomont TP AR 504 | Polypropylene wax maleated | 311 | Insoluble | Insoluble |
| Uniwax 1750 | Stearamide | 275 | Dissolved | |
| Elvax 260 | PE/28% VA | 309 | Softened | |
| Elvax 350 | PE/VA | | Softened | |
| Elvax 450 | PE/18% VA | 302 | Softened | |
| Elvax 750 | PE/9% VA | 307 | Softened | |
| Elvax 770 | PE/9.5% VA | 441 | Softened | Softened |
| Licowax 230 (40%) and AR 504 (10%) | Polypropylene and polypropylene oxidized | | 25% dissolved | 25% dissolved |
| Licowax 230 (25%) and Elvax 750 (25%) | Polypropylene and PE/VA | | 25% dissolved | 25% dissolved |
| Hot glue stick | | | Dissolved | Dissolved |
| Epoxy resin | | | Dissolved | Dissolved |
| Permatex RT silicone | | | Dissolved | Dissolved |

[1]Polyethylene vinylacetate

In a preferred embodiment, the additive composition comprises an additive which is a polyolefin amide alkene-amine in a mineral oil carrier. More preferably, such additive is Product 0276.6, manufactured by The Lubrizol Corporation. Furthermore, the additive may be mixed with matrix materials, such oxidized polypropylene wax and/or polypropylene wax, such as Licowax PP 230 and/or Coathylene PY 0787F (matrix materials), manufactured by the Clariant Corporation. Such matrix materials have a dual purpose, serving as a structural agent, for example, so that particles of the additive composition, including the matrix, maintain a substantially stable structure, and is a sustained release component to reduce the rate of additive release.

In a preferred embodiment, the additive composition comprises about 50% to about 75%, for example, about 66% by weight, of Product 0276.6; about 10% to about 25%, for example, about 17%, by weight of Licowax PP 230; and about 10% to about 25%, for example, about 17%, by weight of Coathylene PY 078F. The additive composition can be in any suitable form, for example, as a single object, such as an object shaped at least somewhat similarly to an ice hockey puck, or as a plurality of particles, such as tablets, pills, grains and the like particulate forms.

The rate of release of the additives may be adjusted by the amount of matrix material. For example, more matrix material content in the additive composition reduce the rate of additive release. In one embodiment, the matrix material constitutes about 10% to about 90% of the total additive composition weight. In a preferred embodiment, the matrix material constitutes about 25% to about 70%, and more preferably about 50%, of the total additive composition weight.

The rate at which the additives is to be released may be adjusted by employing a coating on the additive composition and/or adjusting the thickness of the coating. In a preferred embodiment, the coating constitutes about 5% to about 50% of the total additive composition weight. In a more preferred embodiment, the coating constitutes about 8% to about 25% of the total additive composition weight.

Insoluble coating materials are known and are used to coat additives, such as coolant additives. For example, Hudgens et al in U.S. Pat. No. 5,662,799 disclosed a coolant filter which includes coolant additives encased in an insoluble coating, polyvinyl acetate. The disclosure of this patent is incorporated in its entirety herein by reference.

Although coating additives with an insoluble coating material for use in a coolant system is known, it is surprising that a similar coating is applicable in the fuel system because coolant systems and fuel systems are very different. For example, coolant systems often are closed loops. In contrast, fuel systems are semi-recirculating, with significant recycling. Therefore, fuel systems often require the coating material to be such that it can release sufficient additive for substantially instant combination with the fuel as the fuel passes once through the system. Furthermore, the additives may need to be released at a rate proportional to the flow of fuel, which is not a necessary requirement in coolant systems. Also, cooling system temperatures are often lower than that of fuel systems, for example, engine fuel systems. Furthermore, the fuel systems and coolant systems are chemically different. For example, engine coolants are often aqueous-based which engine fuels often comprise hydrocarbons and are substantially free of water.

The fuel additive compositions above may be present in the housing in the form of a single object. In another embodiment, the compositions are present as a plurality of particles. These compositions may be of various sizes.

Regardless of the size, it is understood that the additive composition can be provided in a variety of shapes, such as cylindrical tablets and cubic tablets, spherical tablets and "donut" shaped pucks. The additive compositions may be cubic. The shape and size of the additive composition can be used in controlling the sustained release rate of the additive.

In one embodiment, the additive composition is in the form of a tablet. The tablet may be a cylinder of about 9 mm length x about 9 mm diameter. The tablet may also be cubical with all sides being about 9 mm. In another embodiment, the additive composition is a flat puck-like structure with a hole in the center, outside diameter of about 8 cm, inside diameter of about 5 cm and height of about 3 cm.

In one broad embodiment of the invention, the methods of forming the compositions are as follows. Substantially solid units of fuel additives, for example fuel dispersants, Lubrizol 129093A, are submerged into or sprayed with a coating material, for example polyethylene vinylacetate copolymer. The coating material envelops and dries over the fuel additive unit. The material including the coating material used to coat the fuel additive unit in this process may initially be a molten coating material or the coating material in a solvent material.

To form the additive-matrix composition, the additive, for example a fuel dispersant, Lubrizol 129093A, is mixed with the molten matrix material, for example, oxidized polyethylene wax. Other matrix materials, as described elsewhere herein, may be used. In one embodiment, the matrix material may be a single-component or multiple component cured polymer. For example, a monomer with catalyst or a two part polymer, such as an epoxy or urethane, can be mixed with the additive and allowed to polymerize or cure into a solid. A coating, as described elsewhere herein, may be applied to the additive-matrix composition to form a coated-additive-matrix composition.

Figure 2:
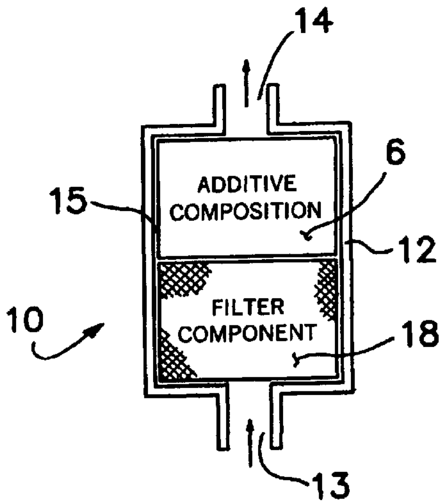
FIG. 2 is a front elevational view in full section of a fuel filter assembly according to a general embodiment of the present invention.

Referring to FIG. 1, an additive assembly in accordance with one embodiment of the invention is shown generally at 1. The additive assembly 1 includes a housing 2 with an inlet port 3, an outlet port 4, and a chamber 5 including fuel additive composition 6 contained therein. The additive assembly 1 is adapted to be placed "in-line" at a suitable location along a fuel line, for example of an internal combustion engine. Fuel flowing toward an engine (not shown) will enter the assembly inlet port 3, flow into the chamber 5 and contact the fuel additive composition 6. The fuel additive composition 6, as described elsewhere herein, comprises a sustained release component, in the form of a fuel insoluble matrix, and a fuel additive component distributed throughout the matrix. Fuel having a portion of the additive composition 6 dissolved therein then passes from the chamber 5 through the outlet port 4. Referring now to FIG. 2, another fuel additive assembly in accordance with the present invention is shown generally at 10. The additive assembly 10 includes the basic components of construction that are typical of a conventional fuel filter. In the shown embodiment 10, a housing 12 is provided which includes inlet port 3, outlet port 4, and ckamber 15. As shown, the housing 12 is adapted to contain both the fuel additive composition 16 and a filter element 18 in ckamber 15.

The inlet port 13 receives fuel into the housing 12. The filter component 18 disposed within the housing 12 filters the fuel. After it is filtered, the fuel comes into contact with the additive composition 16. The additive composition 16, comprising a sustained release component and an additive component, in accordance with the present invention, releases additives into the filtered fuel. Composition 16 is similar to composition 6 except that composition 16 also includes a polymeric coating effective to reduce the rate of additive release into the fuel relative to the rate obtained using composition 6. The filtered fuel containing additives exits the housing 12 through the outlet port 4 and travels to downstream components of the fuel system, such as the fuel injector (not shown).

Figure 3:
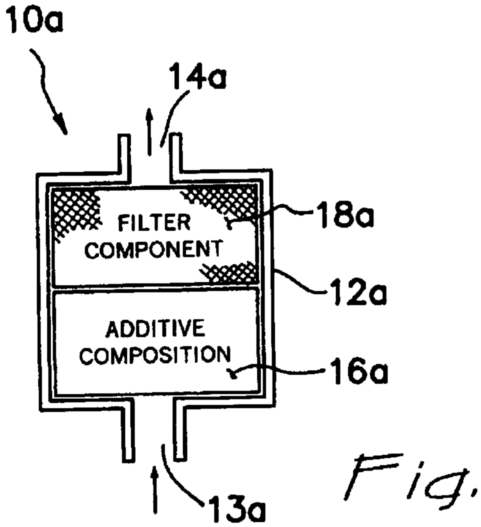
FIG. 3 is a front elevational view in full section of a fuel filter assembly according to another embodiment of the present invention.
Figure 4:
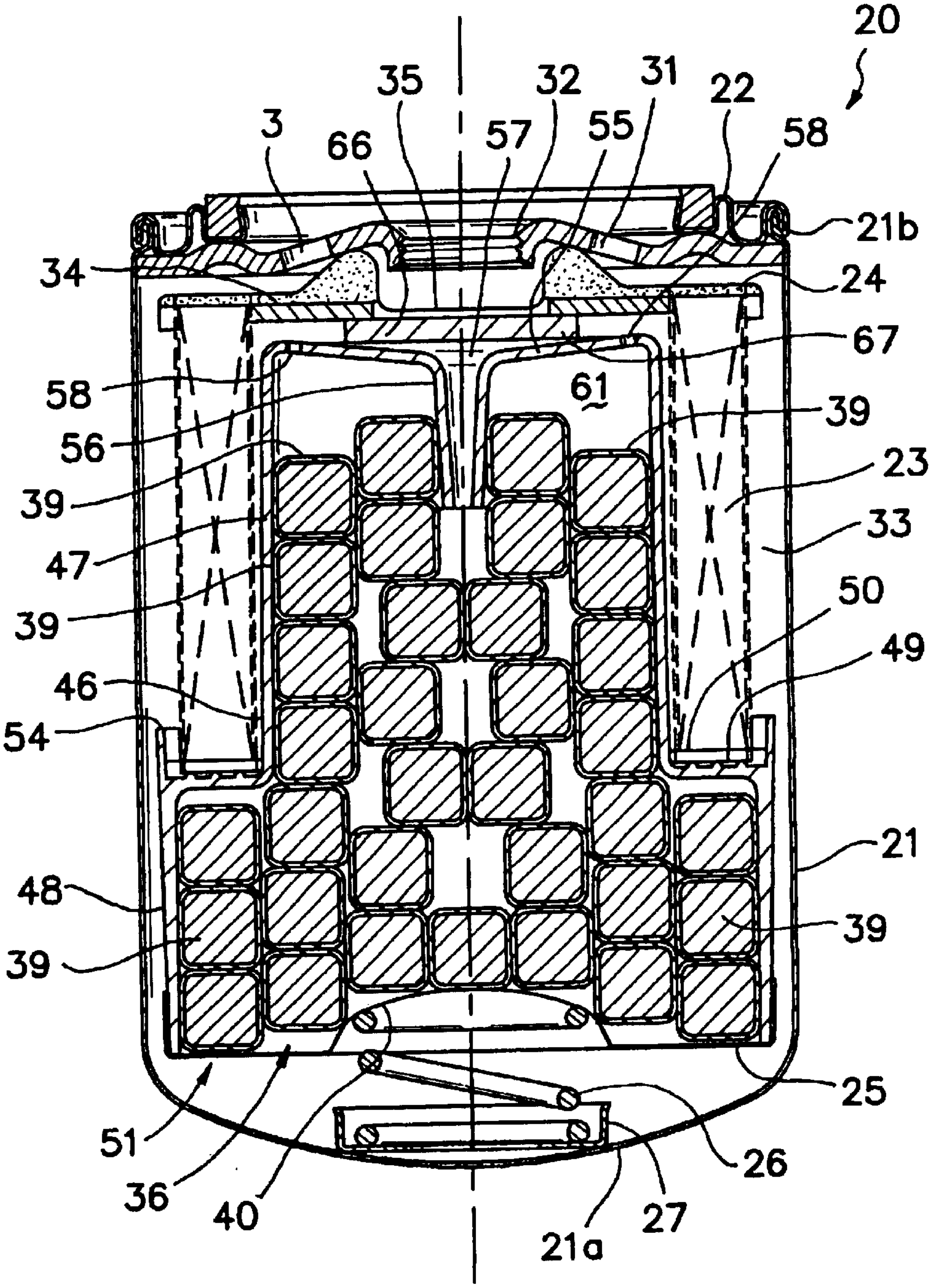
FIG. 4 is a front elevational view in full section of a fuel filter according to another embodiment of the present invention.

FIG. 3 illustrates another embodiment of the invention, fuel additive assembly 10*a*, which is structured similarly to the fuel additive assembly 10 shown in FIG. 2. In assembly 10*a*, fuel in a fuel line enters housing 12*a* through inlet port 3*a*, and contacts the additive composition 16*a* before being filtered through filter element 18*a*. Filtered fuel containing the additives then exits the filter assembly via the outlet port 14*a*. FIGS. 3 and 4 illustrate that the additive composition 16, 16A can be located either upstream or downstream of the filter element 18, 18*a*.

Referring now to FIG. 4, there is illustrated a fuel filter assembly 20 according to the present invention. The basic components of the filter assembly 20 include the annular outer housing 21, nutplate 22, substantially cylindrical filter component 23, outlet endplate 24, base endplate 25, support spring 26, and spring protector 27.

The outer housing 21 has a closed base end 21*a* and an open outlet end 21*b* which is crimped to the outer edge periphery of nutplate 22. The crimped combination creates a filter housing assembly. Nutplate 22 provides the inlet port 31 for fuel to enter the filter assembly 20 and the internally threaded outlet port 32 which is defined by nutplate 22 provides the flow exit for the filtered fuel. The outlet endplate 24 is shaped and arranged relative to the inside surface of the nutplate 22 so as to direct an incoming flow of fuel into annular space 33 and from there through the filter component 23 in a radially inward direction into interior space 34. Interior space 34 leads through a flow control orifice 35 in the outlet endplate 24 to outlet port 32. Outlet endplate 24 is bonded to the adjacent end 38 of filter component 23 by a layer of adhesive. This layer of adhesive also seals off the end of the filter component 23 in order to prevent any undesirable bypass or short circuit flow of fuel.

Base endplate 25 provides a support and seat for the filter component 23 as well as for the components associated with the present invention, including fuel additive composition 36. As shown in FIG. 3, the fuel additive composition 36 is provided in the form of a plurality of sustained release tablets or cubes 39. Each tablet 39 includes fuel additives distributed in a fuel insoluble matrix, which additive/matrix combination is shown as 39*a*. Each tablet 39 is coated so as to further reduce the rate at which the additive is released into the fuel. Fuel additive tablets 39 are structured similarly to fuel additive composition 16, but are of smaller size. Spring 26 is seated inside of spring protector 27 and pushes up against a receiving depression 40 which is formed in the center of base endplate 25.

The fuel filter assembly 20 according to FIG. 4 also includes a molded, unitary endplate 46 which is configured with an inner, substantially cylindrical portion 47 and an outer, substantially cylindrical portion 48. The unitary endplate 46 defines an interior chamber which is filled with additive composition tablets 39 and then enclosed by means of base endplate 25. Annular shelf 49 provides a substantially flat surface for the receipt and support of filter component 15. A layer of adhesive applied between the adjacent end 50 of the filter component 23 and shelf 49 serves the dual purpose of bonding the filter component 23 in place and sealing end 50 of the filter component 23. The outside diameter size of portion 47 is slightly smaller than the inside diameter size of filter component 23. Base endplate 25 fits across the open end 51 of endplate 46 and up around the side so as to close off the open end 51. A relatively short cylindrical wall 54 which is substantially concentric to inner portion 47 creates an annular channel to hold in the adhesive which is applied to shelf 49.

Inner portion 47 includes an upper wall 55 which is adjacent the outlet end 21*b* of the housing 21 and is formed with an inwardly, axially protruding and centered, tapered diffusion tube 56. Diffusion tube 56 defines a tapered diffusion passage or orifice 57 which extends therethrough and establishes a passageway of communication between the interior chamber of endplate 46 and interior space 34. An upper wall 55 is positioned between the source of additive composition 6 and outlet port 32 and the point of exit from diffusion orifice 57 into interior space 34 is coincident with the conical portion of upper wall 55. This arrangement necessitates that any additive which is released from within the interior chamber into the fuel must flow through the diffusion tube 56.

As is illustrated, the unitary endplate 46 as seated within and on base endplate 25 creates an enclosed chamber 61 with the only openings into the enclosed chamber being the diffusion orifice 57. The enclosed chamber 61 is filled with tablets 39 which provide a sustained release of the fuel additive from tablets 39 into the fuel.

In a preferred embodiment, it is possible to use mechanical means to still further slow down the release of additive into fuel, such as configuring endplate 46 with the diffusion tube 56 and diffusion orifice 57. By means of the diffusion tube 56 and diffusion orifice 57, a flow-limiting orifice is provided which limits the engine fuel contact with the additive and thus a slower rate and a longer mileage interval for the additive to dissolve into the engine fuel. As the additive is released into the fuel in chamber 61, there is a higher concentration of additive in the additive/fuel mixture inside of the enclosed chamber 61. The diffusion orifice 57 then limits the rate at which this higher concentration solution diffuses into the main flow stream of fuel which has a lower concentration of additive. Additionally, air vents 58 may be provided to allow air bubbles to escape without having to flow through the diffusion orifice 57.

Another feature of the present invention provides a porous or semipermeable membrane, for example, in the form of a wafer 66, for example, sandwiched between the upper wall 55 and a retaining plate 67, for providing additional slowing of release of the fuel additive due to the structure and/or composition of the wafer 66. This mechanical arrangement may be used in conjunction with the additive composition 36.

The fuel filter assembly 20 can be structured as a cartridge assembly. In one embodiment, the shown filter assembly 20 is configured as a disposable cartridge unit. For example, the outer housing 21 and the nutplate 22 can be structured as separable members, thereby allowing components of the assembly 20 to be removed and replaced. For example, the removable components may comprise the filter component 23, the outlet endplate 24, the base endplate 25, the source of additive composition 36, and the endplate 46.

The following examples illustrate certain aspects of the present invention and are not intended to limit the scope of the invention.

EXAMPLE 1

500 g of Lubrizol OS#69593 dispersant/detergent and 50 g of a commercially available polyethylene wax are provided. The polyethylene wax is heated to a temperature above its melting point, for example, about 140° C. The dispersant/detergent is slowly combined with the molten polyethylene wax with constant stirring until all the dispersant/detergent is included and a substantially uniform mixture is formed. The mixture is then cooled and formed into tablets, using conventional techniques and equipment. The tablets include the dispersant/detergent distributed substantially uniformly in a polyethylene wax matrix.

EXAMPLE 2

600 g (50% by weight Lubrizol OS#69593 in 50% by weight polyethylene (PE wax) in the form of tablets is coated with 191 g of commercially available polyethylene/vinyl acetate copolymer latex over a period of 21 minutes to form coated tablets. Pan speed is 20 rpm, airflow 38 to 52 $ft^3$/min, air inlet temperature ranges from about 42° C. to about 57° C. (about 45° being preferred) and exhaust temperature ranges from about 27° C. to about 32° C. The tablets tumble well and there is virtually no "twinning." Tablets with a dry coating weight of 12.7% are obtained. The tablets have a dull finish and uniform orange peel appearance under the microscope. After standing, blocking of the tablets is apparent.

EXAMPLE 3

800 g of the uncoated tablets having a composition as set forth in Example 2 are placed in the coating unit. A total of 365 g of commercially available polyethylene/vinyl acetate copolymer latex is sprayed and about 25 g of coated tablets are removed approximately every 10 minutes to obtain tablets with increasing coating weights. Total run time is 39 minutes. Pan speed is 20 rpm, airflow is 38 to 42 $ft^3$/min, air inlet temperature ranges from 43° C. to 56° C. and exhaust temperature ranges from 27° C. to 30° C. Tablets with 3.2, 9.7, 15.6 and 18.3% coating (dry weight) are obtained with every 10 minute intervals. The tablets have a dull finish and uniform orange peel appearance under the microscope. After standing, blocking of the tablets is apparent.

EXAMPLE 4

Additives distributed in a soluble matrix may cause the additive composition to become soluble. However, when such composition is coated with polyethylene/vinyl acetate, the additive composition becomes insoluble, even at high temperatures.

For example, at about room temperature, 28° C., both coated and non-coated tablets comprising 50% dispersant/detergent and 50% polyethylene wax are insoluble in fuel. At 82° C., non-coated tablets are completely dissolved. However, tablets coated with 18% polyethylene/vinyl acetate are protected from solubilizing in fuel at 82° C.

EXAMPLE 5

The rate of additive release is dependent on the concentration of the additive in the additive composition. The rate is also dependent on the thickness of the coating material.

If an uncoated tablet is made up of 64% by weight dispersant/detergent and 36% polyethylene wax, the release rate is about 240 mg/L/hr. With lower dispersant concentrations, the rate can be lowered. For example, at 50% or 35% dispersant/detergent, the rate of release is about 50 mg/L/hr. Therefore, reducing additive concentration in a matrix/additive composition reduces the release rates.

Coating the matrix/additive composition also reduces release rates. For example, a 64% dispersant/detergent tablet coated with 5% of polyethylene/vinyl acetate has a release rate of 32 mg/L/hr.

The release rate of 50% dispersant/detergent tablets in a Fleetguard FS 1000 fuel filter is tested. 300 tablets weighing about 190 g total are placed into the filter. Each tablet comprises 50% by weight dispersant/detergent and 50% by weight polyethylene wax. The tablets are not coated. The testing provides for a fuel flow rate through the filter of 5.7 L/min and a total fuel volume of 10 gal (37.85 L). 50 ml of fuel is sampled daily for three weeks. The fuel circulates through the filter continually.

The maximum dispersant/detergent concentration that could be reached is 5,000 mg/L in 600 hours. The test results show that 2,200 mg/L of dispersant/detergent is reached in 300 hours. Extrapolated to 600 hours, the concentration would be 4,400 mg/L, which is about 4 ppm for the number of tablets used. This release rate approximates that needed for constant release over 30,000 miles (600 hours at 50 mph). Moreover, because of fuel by-pass, dispersant/detergent concentration would be higher in a true system. This simulation provides evidence that matrix/additive tablets are an effective approach to providing useful additive concentrations over practical periods of time/mileage.

While this invention has been described with respect to various specific examples and embodiments, it is to be understood that the invention is not limited thereto and that it can be variously practiced with the scope of the following claims.

What is claimed is:

1. A fuel additive composition comprising:

a sustained release component and a fuel additive component, the additive component is effective to provide at least one benefit to a fuel when released into the fuel, the sustained release component is (1) substantially insoluble in the fuel, and (2) effective to reduce the rate of release of the additive component into the fuel relative to an identical composition without the sustained release component, the sustained release component comprises at least one polymeric material including polymer repeating units from an unsubstituted, aliphatic olefin monomer having 2 to about 12 carbon atoms per molecule.

2. The additive composition of claim 1 wherein the sustained release component is mixed with the additive component.

3. The additive composition of claim 2 wherein the sustained release component is present as a matrix in which the additive component is located.

4. The additive composition of claim 1 wherein the sustained release component coats the additive component.

5. The additive composition of claim 3 which further comprises an additional sustained release component coating the matrix and the additive component.

6. An additive composition comprising:

a matrix material and a fuel additive component, the additive component being located in the matrix material and effective, when released into a fuel, to provide at least one benefit to the fuel, the matrix material comprises at least one polymeric material which includes polymer repeating units derived from an olefin component having 2 to about 12 carbon atoms per molecule and is (1) substantially insoluble in the fuel and (2) effective to reduce the rate of release of the additive component into the fuel relative to an identical composition without the matrix material.

7. The additive composition of claim 6 wherein the matrix material is initially a solid in the composition.

8. The additive composition of claim 6 wherein the matrix material is initially in a form selected from the group consisting of a gel and a paste.

9. The additive composition of claim 6 wherein the matrix material comprises more than one polymeric material.

10. The additive composition of claim 6 wherein the polymeric material comprises a polymer of ethylene.

11. The additive composition of claim 6 wherein the polymeric material comprises a copolymer of ethylene and vinyl acetate.

12. The additive composition of claim 6 wherein the polymeric material is at least partially oxidized or at least partially amidized.

13. The additive composition of claim 6 wherein the polymeric material is an oxidized polyethylene wax or an oxidized polypropylene wax.

14. The additive composition of claim 6 wherein the composition has more than one layer, each layer comprises a different mixture of the additive component and the matrix material.

15. An additive composition comprising:

a matrix material and a fuel additive component, the additive component being located in the matrix material and effective, when released into a fuel, to provide at least one benefit to the fuel;

the matrix material comprises at least one polymeric material and is (1) substantially insoluble in the fuel and (2) effective to reduce the rate of release of the additive component into the fuel relative to an identical composition without the matrix material; and a coating material surrounding at least a portion of the additive component and the matrix material, the coating material being present in an amount effective to reduce the rate of release of the additive component into the fuel relative to an identical additive composition without the coating material.

16. The additive composition of claim 15 wherein the coating material comprises a coating polymeric material.

17. The additive composition of claim 16 wherein the coating polymeric material comprises polyethylene vinyl acetate.

18. The additive composition of claim 15 wherein the matrix material has a different composition than the coating material.

19. The additive composition of claim 15 wherein the matrix material has the same composition as the coating material.

20. The additive composition of claim 15 wherein the composition further comprises a release enhancer component in an amount effective to increase the release rate of the additive component from the composition relative to an identical composition without the release enhancer component.

21. The additive composition of claim 20 wherein the release enhancer component is selected from the group consisting of wicking materials, surfactants and mixtures thereof.

22. The additive composition of claim 6 further comprising a reinforcement component in an amount effective to increase the structural strength of the composition relative to an identical composition without the reinforcement component.

23. An additive assembly comprising:

a housing including a fuel inlet and a fuel outlet; and an additive composition disposed within the housing and including a fuel additive component and a matrix material comprising at least one polymeric material including polymer repeating units derived from an olefin component having 2 to about 12 carbon atoms per molecule, the additive component being located in the matrix material and effective, when released into a fuel, to provide at least one benefit to the fuel, the matrix material is (1) substantially insoluble in the fuel in contact with the additive composition and (2) effective to reduce the rate of release of the additive component into the fuel relative to an identical additive composition without the matrix material.

24. The additive assembly of claim 23 wherein the matrix material is substantially hydrocarbon insoluble.

25. The additive assembly of claim 23 wherein the polymeric material includes polymer repeating units derived from ethylene.

26. The additive assembly of claim 23 wherein the polymeric material comprises a copolymer of ethylene and vinyl acetate.

27. The additive assembly of claim 23 wherein the polymeric material is at least partially oxidized or at least partially amidized.

28. The additive assembly of claim 23 further comprising a coating material surrounding at least a portion of the additive component and the matrix material, the coating material being in an amount effective to reduce the rate of release of the additive component into the fuel relative to an identical additive composition without the coating material.

29. The additive assembly of claim 28 wherein the coating material comprises a coating polymeric material.

30. The additive assembly of claim 29 wherein the coating polymeric material is polyethylene vinyl acetate.

31. The additive assembly of claim 23 wherein the additive composition is present in the housing as a plurality of particles.

32. A method of producing an additive composition for providing a benefit to a fuel comprising the steps of:

combining a fuel additive component with a matrix material to form a mixture, the matrix material has a melting point of at least about 82° C. and the combining step at least partially occurs with the matrix material in the molten state the additive component being effective to provide at least one benefit to a fuel when released into the fuel, the matrix material being substantially insoluble in the fuel; and forming one or more discrete units of the mixture, the matrix material comprises at least one polymeric material, the discrete unit or units of the mixture providing a reduced rate of release of the additive component into a fuel relative to an identical unit or units without the matrix material.

33. The method of claim 32 wherein the matrix material is substantially hydrocarbon insoluble.

34. The method of claim 44 which further comprise providing a coating material on the one or more discrete units, the coating material being effective to reduce the rate of release of the additive component into a fuel relative to an identical unit or units without the provided coating material.

35. An additive composition comprising:

a matrix material and an additive component, the additive component being located in the matrix material and effective, when released into a fuel, to provide at least one benefit to the fuel, the matrix material comprises an aliphatic acid component, and is (1) substantially insoluble in the fuel and (2) effective to reduce the rate of release of the additive component into the fuel relative to an identical composition without the matrix material.

36. The additive composition of claim 35 wherein the aliphatic acid component includes aliphatic acid molecules having about 18 to about 36 carbon atoms.

37. The additive composition of claim 35 wherein the aliphatic acid component includes aliphatic acid molecules having about 28 to about 36 carbon atoms.

38. The additive composition of claim 35 wherein the aliphatic acid component includes a montanic acid.

39. An additive assembly comprising:

a housing including a fuel inlet and a fuel outlet; and an additive composition disposed within the housing and including an additive component and a matrix material comprising an aliphatic acid component, the additive component being located in the matrix material and effective, when released into a fuel, to provide at least one benefit to the fuel, the matrix material is (1) substantially insoluble in the fuel in contact with the additive composition and (2) effective to reduce the rate of release of the additive component into the fuel relative to an identical additive composition without the matrix material.

40. The additive composition of claim 39 wherein the aliphatic acid component includes aliphatic acid molecules having about 18 to about 36 carbon atoms.

41. The additive composition of claim 39 wherein the aliphatic acid component includes aliphatic acid molecules having about 28 to about 36 carbon atoms.

42. The additive assembly of claim 39 wherein the aliphatic acid component includes a montanic acid.

43. The additive composition of claim 1 wherein the at least one polymeric material includes polymer repeating units from at least one of ethylene and propylene.

44. The additive composition of claim 1 wherein the at least one polymeric material includes polymer repeating units from ethylene.

45. The method of claim 32 wherein the polymeric material includes polymer repeating units derived from an olefin component having 2 to about 12 carbon atoms per molecule.

* * * * *